Oct. 19, 1937.  L. G. COPEMAN  2,096,088
METHOD AND APPARATUS FOR CONDITIONING AND DISPENSING BEER
Filed Nov. 24, 1933  3 Sheets—Sheet 1

INVENTOR.
LLOYD G. COPEMAN.
BY
Barnes, Kisselle & Laughlin
ATTORNEYS.

Oct. 19, 1937.   L. G. COPEMAN   2,096,088
METHOD AND APPARATUS FOR CONDITIONING AND DISPENSING BEER
Filed Nov. 24, 1933   3 Sheets—Sheet 2
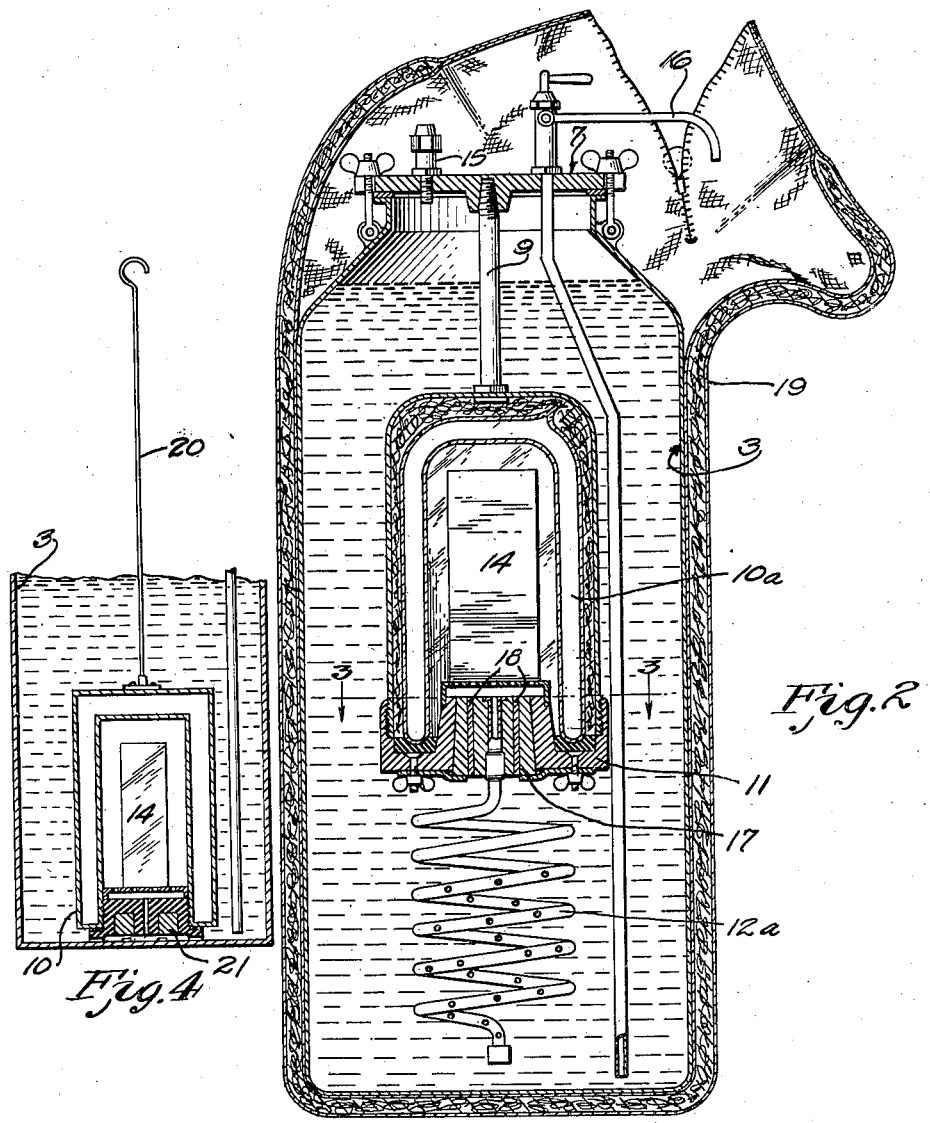
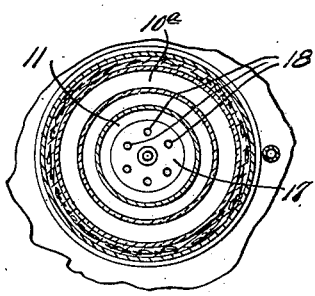
INVENTOR.
Lloyd C. Copeman
BY
Barnes, Kissell & Laughlin
ATTORNEYS Oct. 19, 1937.  L. G. COPEMAN  2,096,088
METHOD AND APPARATUS FOR CONDITIONING AND DISPENSING BEER
Filed Nov. 24, 1933  3 Sheets-Sheet 3

INVENTOR.
Lloyd G. Copeman
BY
Barnes, Kisselle & Laughlin
ATTORNEYS

Patented Oct. 19, 1937

2,096,088

UNITED STATES PATENT OFFICE 2,096,088

METHOD AND APPARATUS FOR CONDITIONING AND DISPENSING BEER

Lloyd G. Copeman, Flint, Mich., assignor to Copeman Laboratories Company, Flint, Mich., a corporation of Michigan Application November 24, 1933, Serial No. 699,591

18 Claims. (Cl. 225—18)

This invention relates to a method and apparatus for conditioning and dispensing beer, and has to do particularly with beer conditioning and dispensing apparatus of the portable type.

One of the main objects of the present invention resides in the use of solidified $CO_2$ as a cooling and conditioning medium, said solid $CO_2$ being directly immersed in the liquid to be conditioned, cooled and dispensed, but without reducing the liquid to a relatively low temperature; in its preferred form the liquid, which in most cases will be beer, is lowered to and maintained at substantially 40° F.

A further feature of the invention has to do with the immersion of beer conditioning and dispensing means directly in the beer itself, but in such a manner that the beer is not cooled below normal palatable temperature; in the preferred form the beer is even precooled before being placed in the container whereby the main function of the immersed means is to condition the beer and to some extent maintain the same in its cooled condition.

Other features have to do with wall structure for separating the solid $CO_2$ from the liquid and having a predetermined insulating effect whereby heat transfer will be so retarded as to keep the beer above its minimum palatable temperature.

Other features include the general structure of the portable container and also details of regulable conducting means for varying the temperature of the liquid, as will be more clearly set forth in the specification and claims.

In the drawings:

Fig. 2 is a vertical sectional view illustrating a somewhat modified form of structure both as to the details of the immersed conditioning unit and the insulating means for the entire container.

Fig. 3 is a sectional view taken on line 3—3 of Fig. 1, and illustrating particularly the removable closure member and regulable conducting means for predetermining the temperature of the liquid.

Fig. 4 is a further modified embodiment wherein the cooling and conditioning unit is so designed in such a way as to rest on the bottom of the main container.

It is often desirable for home use, picnics, and even small restaurants and the like, to dispense beer directly from the container in which it is delivered from the brewer. Several attempts have been made along this line, but the beer is charged with $CO_2$ at the brewery, just as is the practice in filling the standard beer barrels, and the beer container placed in a domestic refrigerator to keep it cool or packed with ice or the like, and the originally charged beer will retain enough $CO_2$ to give a fairly palatable drink until about half of the beer is dispensed.

The gist of the present invention may be said to reside in the dispensing of beer directly from its own container and the proper conditioning of the beer by the direct immersion therein of solid $CO_2$. Here we have two outstanding problems, one being that beer cannot be dispensed below 40° for palatable drinking, and the other being that a chunk of solid $CO_2$ dropped directly in beer has a peculiar action in that it will not be covered with a coating of ice as is the case when solid $CO_2$ is dropped in water, but the alcohol in the beer will act as a sort of brine, preventing the formation of this film of ice and thereby greatly accelerating the sublimination of the $CO_2$. Beer will freeze at 28° F., but although solid $CO_2$ has a temperature of around 114° below zero, it will not freeze the beer by direct contact therewith (at least not for some little time) but only greatly increases the sublimination of the solid $CO_2$. The result is that if a chunk of solid $CO_2$ is dropped in a container of beer the pressure created will be terrific, resulting in much danger and probable damage.

Figure 1:
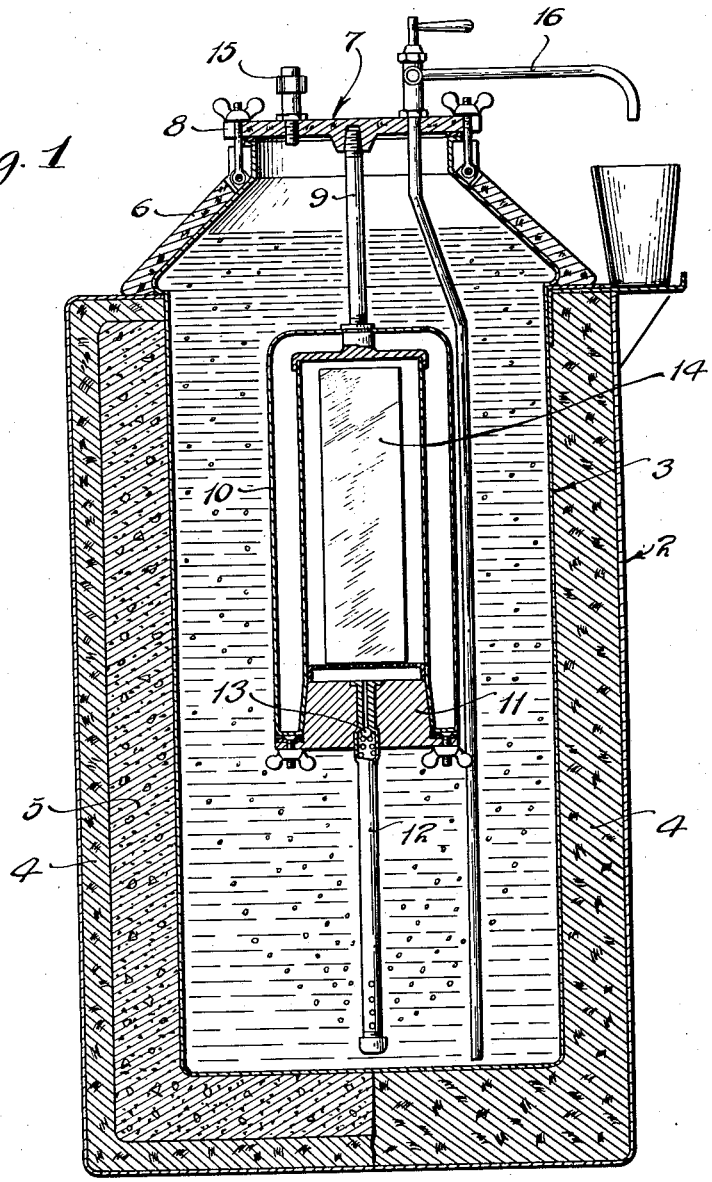
Fig. 1 is a vertical sectional view of a portable dispensing unit including cooling and conditioning means fabricated in accordance with the present invention.

Referring to Fig. 1, it will be seen that I have provided a container generally designated 2 for receiving a beer or other carbonated beverage container 3. A layer of insulation 4 preferably separates the two containers and in some instances, where the container is to remain at the place of dispensing, a layer of stone 5 or similar hold-over material may be utilized.

The top of the container 3 is preferably insulated as at 6, and such container is provided with a removable head 7, tightly clamped in position as at 8 and including a supporting rod 9 for carrying a solid $CO_2$ container unit 10. This unit 10 is a double walled container, preferably a vacuum container. The evaporated $CO_2$ gases are conducted away from the container 10 through a removable head 11, and a conduit 12 is provided with a check valve 13 to positively prevent the return of any liquid into the container 10.

In operation, the beer in either its partially charged condition, as is usually customary, or in a flat condition, and preferably precooled, is poured into the container 3; the container 10 is filled with a block of solid $CO_2$ 14 and lowered into the beer and the head 7 clamped into position, as shown in Fig. 1. The degree of vacuum or, in other words, the degree of insulation provided by the container 10, is just sufficient, when balanced by the insulation 4, to, under normal temperature conditions, maintain the beer at about 40° F. Even if the beer is poured into the container when flat, the evaporated $CO_2$ gases passing from the container 10 out through the pipe 12 will, within a very few minutes, sufficiently charge the beer as to make it very palatable. The $CO_2$ gases not absorbed by the beer will collect in the top of the container 3 and serve as the required pressure for dispensing the beer, an adjustable pressure regulating valve 15 determining the pressure at which the beer is to be dispensed. Thus, if the beer is precooled before insertion in the container 3 it will absorb much more $CO_2$ and it will be seen that in a very few minutes the entire body of beer will be thoroughly charged by the evaporated $CO_2$ gases to produce a live, unusually palatable glass of beer. All bitterness is removed and the beer is in a fully charged, preserved condition, even when used down to the very bottom of the container. Dispensing is directly from the container by means of a faucet 16 so that the container serves as its own bar. If all the beer is not used in five or six days time, the head 7 is removed and a new charge of solid $CO_2$ placed within the container 10.

In the modification illustrated in Fig. 2, substantially the same structural design is followed as in Fig. 1, except that a glass type vacuum container 10a is used for the solid $CO_2$ and a cap or collar 11 is provided with a removable insert 17. This insert 17 may be provided with one or two copper conductor members 18, as shown in Fig. 2, or with a plurality of copper conductor members 18 as shown in Fig. 3, so that merely by removing one insert 17 and replacing the same with another which is provided with more or less copper conductors 18, it is possible to vary the conductivity between the solid $CO_2$ chamber and the beer, thus effecting a greater or less cooling effect, as desired. A coiled conduit 12a also permits a slightly greater cooling effect for presenting a greater surface area of cold $CO_2$ gases. The unit shown in Fig. 2 is designed to be more portable than that shown in Fig. 1, with the result that the more permanent insulation is replaced by a bag 19 of relatively good insulating material, so that the entire unit may be delivered from the brewery precooled with the result that the beer will be conditioned and kept at the proper temperature a relatively long time.

In the modification shown in Fig. 4, I have shown a solid $CO_2$ container 10 of the same general structure as that shown in Fig. 1. In this case the container 10 is not supported from a head 7 but is lowered separately by means of a suitable handle 20 into the beer. A weighted cap 21 for the container 10 will maintain the $CO_2$ container at the bottom of the main beer container, and an aperture in the cap for the container will release the evaporating $CO_2$ gases into the beer.

Figure 5:
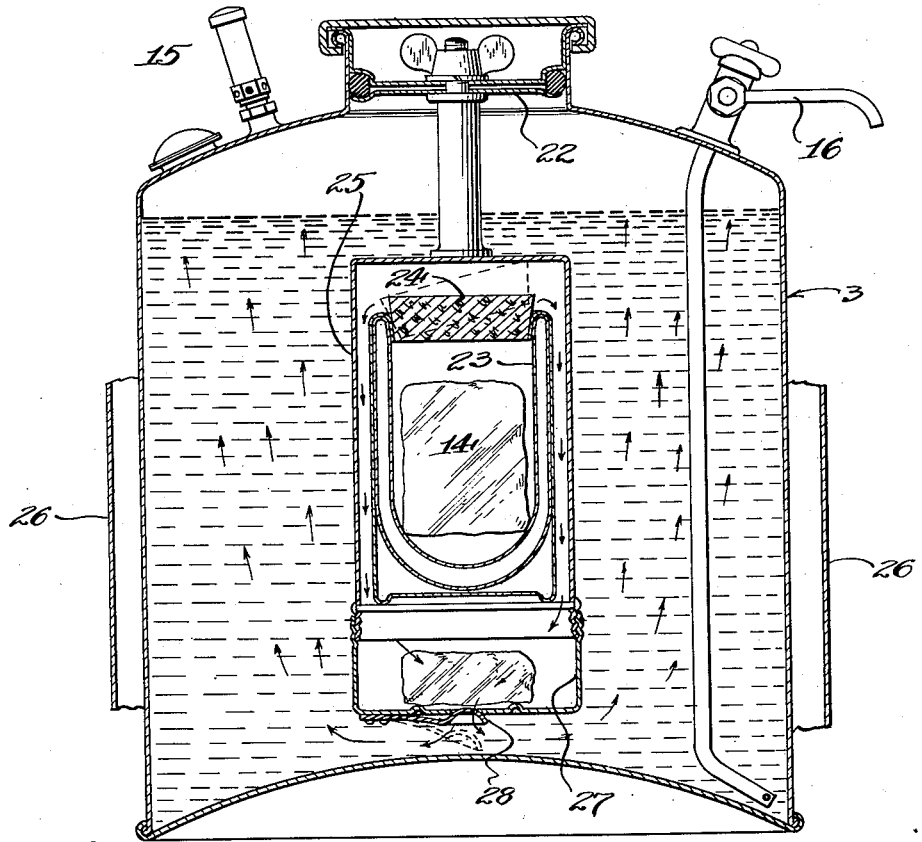
Fig. 5 is a vertical sectional view illustrating the adaptation of the invention to a smaller type dispensing unit and also showing the solid $CO_2$ container in its preferred form.

In the modification shown in Fig. 5, which is the preferred modification, the beer is dispensed directly from the main beer container 3 as by means of the spigot 16 so that, as in the rest of the forms, the container 3 serves as its own bar. A head 22 is suitably clamped to the top of the container 3 and is adapted to support a three walled solid $CO_2$ container. Here a vacuum or similar insulating container 23 is supported in upright position and normally closed by a cork 24. An outer wall 25 surrounds the container 23 and supports the same by a removable pin so that the evaporated $CO_2$ gases must first raise the cork 24 and then pass upwardly and downwardly between the container 23 and the outer wall 25. An outer insulating wall 26 may be used in which case the insulating effect of the container 23 and wall 25 is so proportioned and balanced against the insulating effect of the outer wall as to maintain the beer at the proper palatable temperature. In the absence of such outer insulating wall 26 the complete container 25 is so designed as to conductivity as not to cool the beer below the required temperature. When there is but a single outer wall for the container 3 presenting very little insulating effect, it is best that the beer be precooled and the container kept in a cool place so that the main function of the solid $CO_2$ is to condition and dispense the beer rather than to cool the same. With the double container arrangement, as shown in this preferred modification, it will be seen that even if the supply of solid $CO_2$ should become exhausted, there is no possibility of the beer passing up between the walls of the containers far enough to contact with the cork 24. Beer contacting with cork for any length of time will give it a very peculiar, objectionable taste.

In delivering a self-dispensing container of this type, and particularly where the beer is precooled but relatively flat, it may take ten or fifteen minutes after the beer is delivered before it is properly conditioned and ready for consumption. To overcome this defect I have provided a container 27, readily attachable to the lower end of the container 25 and adapted to receive a small piece of solid $CO_2$, the evaporation of which will be greatly accelerated by the heat from the beer to release a relatively large supply of $CO_2$ and thus condition the beer in a very short time. Such a container and small piece of solid $CO_2$ inserted in the beer before delivery to the home or the place of consumption will insure the beer being in proper condition upon arrival. A light spring pressed valve 28 in the bottom of the auxiliary container 27 prevents inflow of beer into the auxiliary container. This small charge of solid $CO_2$ in the auxiliary container will also assist in cooling the beer. It will be obvious that the main container 25 may be used without this auxiliary container 27, dependent entirely upon distribution conditions in any particular locality.

It will thus be seen that a thermos circulation will be set up in the liquid within the container 3 in that the liquid adjacent the $CO_2$ container 25 will flow downwardly, being cooled by the said container, so that the $CO_2$ gases flowing downwardly between the container 23 and the outer wall 25 will flow in the same direction as the descending liquid; in other words, the $CO_2$ gases will wipe the outer wall 25 on the inside when flowing downwardly and a portion of the liquid will wipe the outer surface of the wall 25 and will move in the same direction as the downwardly descending CO₂ gases.

Figure 6:
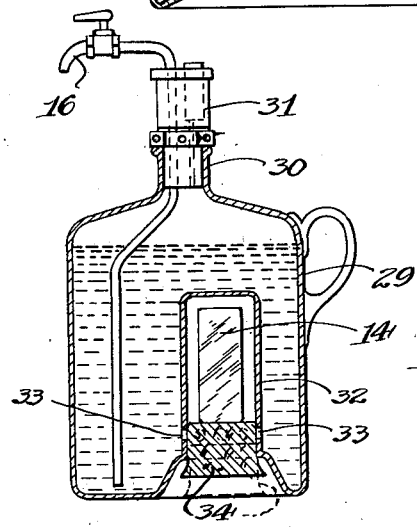
Fig. 6 is a view of a modified form of smaller dispensing unit of the glass jug type so arranged that the solid $CO_2$ may be inserted in the bottom of the unit.

In the modification illustrated in Fig. 6, I have shown my method of conditioning and cooling or partially cooling as embodied in a small glass container 29 having a relatively small opening 30 for the insertion of a combined dispensing plug and relief valve 31. Here the CO₂ container 32 is preferably also formed of glass and is preferably formed integrally with the bottom of the main beer container. The lower end of the container 32 is provided with a plurality of ports 33 which ports are initially covered by a closure member 34. In filling this transparent container, the cork may be positioned all the way in, as shown in solid lines, the container filled with beer from the top, and the combined closure member and relief valve 31 inserted in place. The container 29 may be then inverted, the stopper 34 removed, and a block of solid CO₂ inserted in place, after which the plug 34 may be forced all the way into said position, shown in full lines. When the container is turned upright, to the position shown in Fig. 6, the cork may be moved down, or otherwise forced down as by the pressure of the CO₂ gas, which will uncover the ports 33 so that evaporating CO₂ gases will escape outwardly at the bottom of the container and into the body of beer. It will also be obvious that the cork 34 may be forced out sufficiently far to release pressure from the container 32 directly to the atmosphere, in the event the valve 31 becomes clogged, or if for any other reason, the pressure in the container 32 becomes abnormally great.

It will thus be seen that in all structures embodying the present invention, the CO₂ gases are taken off the bottom of the immersed solid CO₂ container, whether said container is secured to the bottom of the main beer container or is suspended from a head or is weighted. This is a very important feature of the present invention. It will also be obvious that the high degree of insulation provided will prevent the beer from being dispensed at a temperature below 40° and that whether the solid CO₂ is to be used in cooling the beer or mainly for conditioning and assisting in maintaining the length of cooling of a precooled beer, the degree of insulation is always proportioned to the results desired. Even though no insulation is provided for the outside of the main beer container 3, a sufficient charge of solid CO₂ may be used in the CO₂ container to maintain the beer at approximately 40°; however, this would take a rather large supply of CO₂ and it will usually be best to insulate the outer container or, in the use of small domestic containers holding a fairly small supply, it would be best to precool the beer and use the CO₂ charge mainly as a conditioning and dispensing means and assisting in prolonging the cooling period, in addition to outside cooling means to be used, of course, as desired. It will also be seen that in any of the modifications illustrated, either the built up pressure within the container or the position of the container itself will effectively prevent contact between the beer and the cake of solid CO₂.

What I claim is:

1. A dispensing, conditioning and cooling unit for beer and the like, comprising a container for receiving a body of liquid to be cooled, a second container for receiving a body of solid CO₂, said second container being at least partially immersed during the greater part of the dispensing operation in said body of liquid, a dispensing tube carried by the first container and extending to a point adjacent the bottom of the main container, said CO₂ container being so fabricated as to discharge the evaporated CO₂ gases only from the bottom portion of said immersed container into the body of liquid whereby to charge the same and assist in cooling the same, and means in the top of the liquid container for controlling the maximum pressure therein, said pressure serving, in turn, to exhaust the liquid through the dispensing tube.

2. A dispensing, conditioning and cooling unit for beer and the like, comprising a container for receiving a body of beer to be cooled, a second container for receiving a body of solid CO₂, said second container being at least partially immersed when in operation in said body of beer, a dispensing tube carried by the first container and extending to a point adjacent the bottom of the main container, said CO₂ container being so fabricated as to discharge the evaporated CO₂ gases only from the bottom portion of said immersed container into the body of beer whereby to charge the same and assist in cooling the same, and means in the top of the liquid container for controlling the maximum pressure therein, said pressure serving, in turn, to exhaust the beer through the dispensing tube, said means being adjustable to vary the pressure and predetermine the head on the beer drawn from said dispensing member.

3. A dispensing, conditioning and cooling unit for beer and the like, comprising a container for receiving a body of liquid to be cooled, an insulated container for receiving a body of solid CO₂, said insulated container being at least partially immersed when in operation in said body of liquid, a dispensing tube carried by the first container and extending to a point adjacent the bottom of the main container, said CO₂ container being so fabricated as to discharge the evaporated CO₂ gases only from the bottom portion of said immersed container into the body of liquid whereby to charge the same and assist in cooling the same, and means subject to gases in the top of the liquid container for controlling the maximum pressure therein, said pressure serving, in turn, to exhaust the liquid through the dispensing member, the degree of insulation being such as to retard the transfer of heat units through the insulated wall to such an extent as to prevent the liquid from freezing.

4. A dispensing, conditioning and cooling unit for beer and the like, comprising a container for receiving a body of beer to be cooled, an insulated container for receiving a body of solid CO₂, said insulated container being at least partially immersed when in operation in said body of beer, a dispensing tube carried by the first container and extending to a point adjacent the bottom of the main container, said CO₂ container being so fabricated as to discharge the evaporated CO₂ gases from the bottom portion of said immersed container into the body of beer whereby to charge the same and assist in cooling the same, and means subject to gases in the top of the liquid container for controlling the maximum pressure therein, said pressure serving, in turn, to exhaust the beer through the dispensing member, said means being adjustable to vary the pressure and predetermine the head on the beer drawn from said dispensing tube, the degree of insulation being such as to retard the transfer of heat units through the insulated wall to such an extent as to prevent the beer freezing.

5. A dispensing, conditioning and cooling unit for beer and the like, comprising an insulated container for receiving a body of liquid to be cooled, a second insulated container for receiving a body of solid $CO_2$, said second insulated container being at least partially immersed when in operation in said body of liquid, a dispensing tube carried by the first insulated container and extending to a point adjacent the bottom of the main container, said $CO_2$ container being so fabricated as to discharge the evaporated $CO_2$ gases from the bottom portion of said immersed container into the body of liquid whereby to charge the same and assist in cooling the same, and means in the top of the container for controlling the maximum pressure therein and to in turn supply pressure for exhausting the liquid through the dispensing member, the degree of insulation being such as to retard the transfer of heat units through the insulated wall to such an extent as to prevent the liquid from freezing.

6. A dispensing, conditioning and cooling unit for beer and the like, comprising a container for receiving a body of liquid to be conditioned and dispensed, a second container for receiving a body of solid $CO_2$, the greater portion of the walls of said second container in contact with the liquid being insulated to greatly retard heat transfer therethrough, means for conducting evaporated $CO_2$ gases into the lower portion of said body of liquid to condition said liquid and serve as pressure dispensing means, and heat conducting means forming a part of said second container for assisting in predetermining the heat transference between the $CO_2$ container and the liquid and in predetermining the temperature of the liquid.

7. A dispensing, conditioning and cooling unit for beer and the like, comprising an insulated container for receiving a body of liquid to be cooled, a second insulated container for receiving a body of solid $CO_2$, said second insulated container being at least partially immersed when in operation in said body of liquid, a dispensing tube carried by the first insulated container and extending to a point adjacent the bottom of the main container, said $CO_2$ container being so fabricated as to discharge the evaporated $CO_2$ gases from the bottom portion of said immersed container into the body of liquid whereby to charge the same and assist in cooling the same, and means in the top of the container for controlling the maximum pressure therein and to in turn supply pressure for exhausting the liquid through the dispensing member, the insulation on said containers being so proportioned as to maintain said liquid substantially at a predetermined temperature, above freezing, substantially all of the evaporated $CO_2$ gases from said solid $CO_2$ container normally passing out of said $CO_2$ container up through the liquid and into the space above the liquid or out through said last named means.

8. A solid $CO_2$ container unit of the type adapted to be at least partially immersed in a liquid for carbonating same, comprising an inner container having a gas escape opening at one end, and an outer container enclosing said opening and a portion of the walls of said first container whereby to form an air seal to prevent liquid from entering said inner container.

9. A dispensing, conditioning and cooling unit for beer and the like, comprising a container for receiving a body of liquid to be conditioned and dispensed, a second container for receiving a body of solid $CO_2$, the greater portion of the walls of said second container being insulated to greatly retard heat transfer therethrough, means for conducting evaporated $CO_2$ gases into the lower portion of said body of liquid to condition said liquid and serve as pressure dispensing means, heat conducting means forming a part of said second container for assisting in predetermining the heat transference between the $CO_2$ container and the liquid and in predetermining the temperature of the liquid, and an auxiliary container for receiving a relatively small charge of solid $CO_2$ for initially accelerating the charging of the liquid.

10. A solid $CO_2$ container unit of the type adapted to be at least partially immersed in a liquid for carbonating same, comprising an inner container having a gas escape opening at one end, an outer container enclosing said opening and a portion of the walls of said first container whereby to form an air seal to prevent liquid from entering said inner container, and an auxiliary container for receiving a relatively small charge of solid $CO_2$ for initially accelerating the charging of the liquid.

11. A solid $CO_2$ container unit of the type adapted to be at least partially immersed in a liquid for carbonating same, comprising an inner container having a gas escape opening at one end, an outer container enclosing said opening and a portion of the walls of said first container whereby to form an air seal to prevent liquid from entering said inner container, insulation means positioned between said solid $CO_2$ and liquid, and an auxiliary container for receiving a relatively small charge of solid $CO_2$ for initially accelerating the charging of the liquid.

12. A dispensing, conditioning and cooling unit for beer and the like, comprising a container for receiving a body of liquid to be conditioned and dispensed, an opening in said container and a closure for said opening, a second container suspended from said closure member, and adapted to contain a body of solid $CO_2$, said second container being so positioned as to discharge $CO_2$ directly into the liquid, and adjustable means positioned in said first container for controlling the release of $CO_2$ gas collected above the liquid in said first container.

13. A dispensing, conditioning and cooling unit for beer and the like, comprising a container for receiving a body of liquid to be conditioned and dispensed, an opening in said container and a closure for said opening, a second container suspended from said closure member, said second container being adapted to contain a body of solid $CO_2$, said second container being so positioned as to discharge $CO_2$ directly into the liquid and so fabricated as to prevent freezing of the liquid by the solid $CO_2$, means carried by said closure member for effecting dispensing of the beer, and means carried by said closure member for controlling the maximum pressure in the main container, said pressure serving, in turn, to exhaust the beer through the dispensing means.

14. A dispensing, conditioning and cooling unit for beer and the like, comprising a container for receiving a body of liquid to be conditioned and dispensed, an opening in said container and a closure for said opening, a second container suspended from said closure member, said second container containing a body of solid $CO_2$, said second container being so positioned as to discharge $CO_2$ directly into the liquid, means carried by said closure member for effecting dispensing of the beer, and means similarly carried for adjustably controlling the release of gas from the space above the liquid.

15. A dispensing, conditioning and cooling unit for beer and the like, comprising a container for receiving a body of liquid to be conditioned and dispensed, an opening in said container and a closure for said opening, a second container suspended from said closure member, said second container having an opening for receiving a body of solid $CO_2$, said opening being accessible for the adding of solid $CO_2$ only upon removal of said closure, said second container being so positioned as to discharge $CO_2$ directly into the liquid, means carried by said closure member for effecting dispensing of the beer and means similarly carried for adjustably controlling the release of gas from the space above the liquid.

16. A dispensing, conditioning and cooling unit for beer and the like, comprising a container for receiving a body of beer to be cooled, a solid $CO_2$ container unit carried by a wall of the main container and at least partially immersed in the liquid within the main container, an opening formed in said solid $CO_2$ container for directing evaporating $CO_2$ gases into the liquid, means for opening and closing said $CO_2$ container opening, a dispensing tube carried by the main container and extending to a point adjacent the bottom thereof and means positioned in a wall of said main container subject to the collected $CO_2$ gases in the top of the main container for controlling the maximum pressure therein, said pressure serving, in turn, to exhaust the beer through the dispensing member, substantially all the evaporated $CO_2$ gases from said solid $CO_2$ container normally passing through the opening in said $CO_2$ container up through the beer and into the space above the beer or out through said last named means.

17. A dispensing, conditioning and cooling unit for beer and the like, comprising a transparent container for receiving a body of beer to be cooled, a solid $CO_2$ container unit carried by a wall of the main container and at least partially immersed in the liquid within the main container, an opening formed in said solid $CO_2$ container for directing evaporating $CO_2$ gases into the liquid, means for opening and closing said $CO_2$ container opening, a dispensing tube carried by the main container and extending to a point adjacent the bottom thereof and means positioned in a wall of said main container and means subject to the collected $CO_2$ gases in the top of the main container for controlling the maximum pressure therein, said pressure serving, in turn, to exhaust the beer through the dispensing member, substantially all the evaporated $CO_2$ gases from said solid $CO_2$ container normally passing through the opening in said $CO_2$ container up through the beer and into the space above the beer or out through said last named means, said last named means being adjustable to control the effective pressure within the main container.

18. A dispensing, conditioning and cooling unit for beer and the like, comprising a container for receiving a body of liquid to be conditioned and dispensed, an opening in said container and a closure for said opening, a second container suspended from said closure member and adapted to contain a body of solid $CO_2$, said second container being so positioned as to discharge $CO_2$ directly into the liquid and so fabricated as to prevent freezing of the liquid by the solid $CO_2$, and adjustable means positioned in said closure member for controlling the release of $CO_2$ gas collected above the liquid in said first container, substantially all the evaporated $CO_2$ gases from said solid $CO_2$ container normally passing out of said $CO_2$ container up through the liquid and into the space above the liquid or out through said last named means, said last named means being adjustable to control the effective pressure within the main container.

LLOYD G. COPEMAN.